E. M. DE LAY.
FLUID PRESSURE OPERATED APPARATUS FOR STOPPING AUTOMOBILES OR THE LIKE.
APPLICATION FILED JAN. 10, 1917.
1,253,357.
Patented Jan. 15, 1918.
2 SHEETS—SHEET 1.
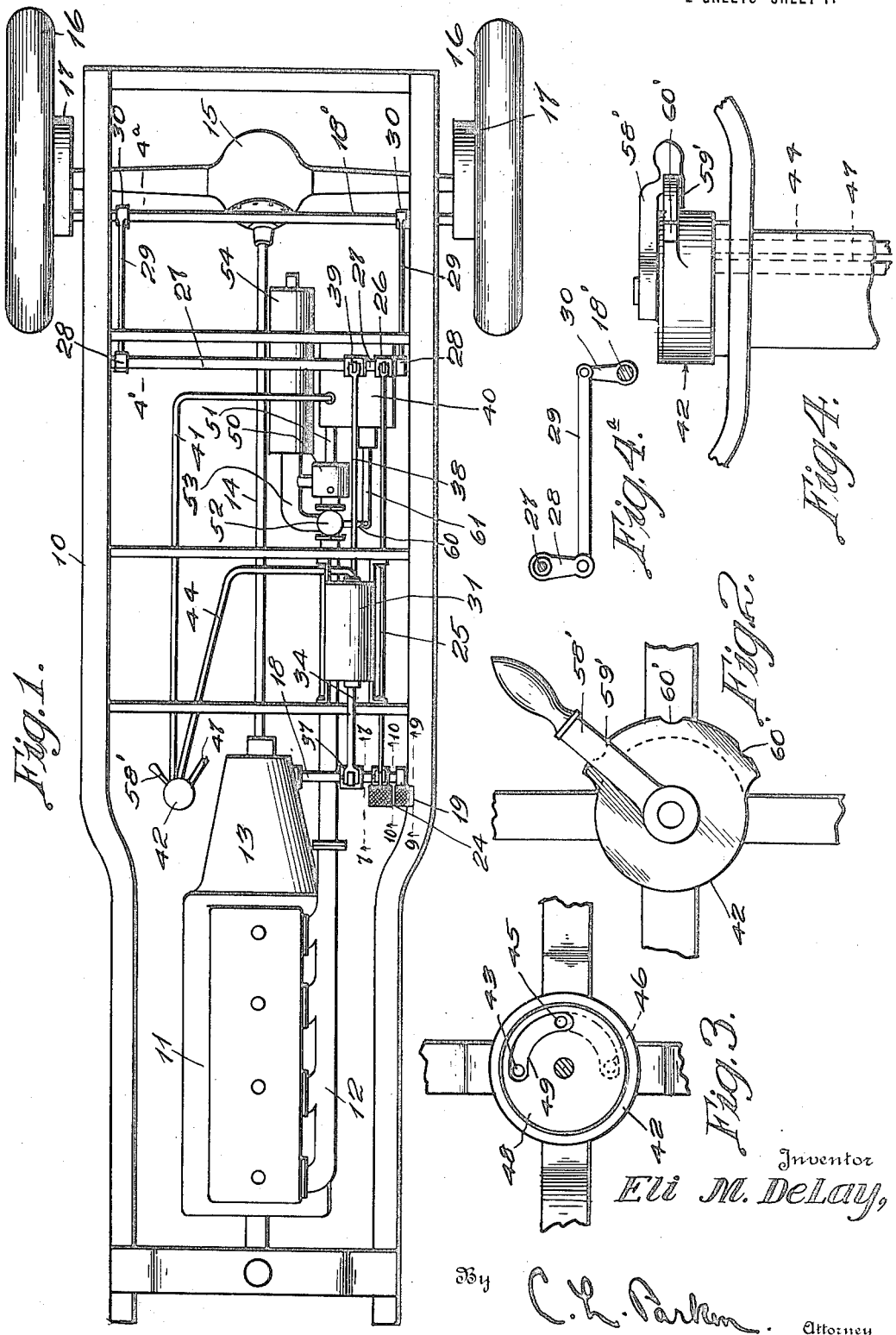
Inventor
Eli M. DeLay,
By C. L. Parker, Attorney

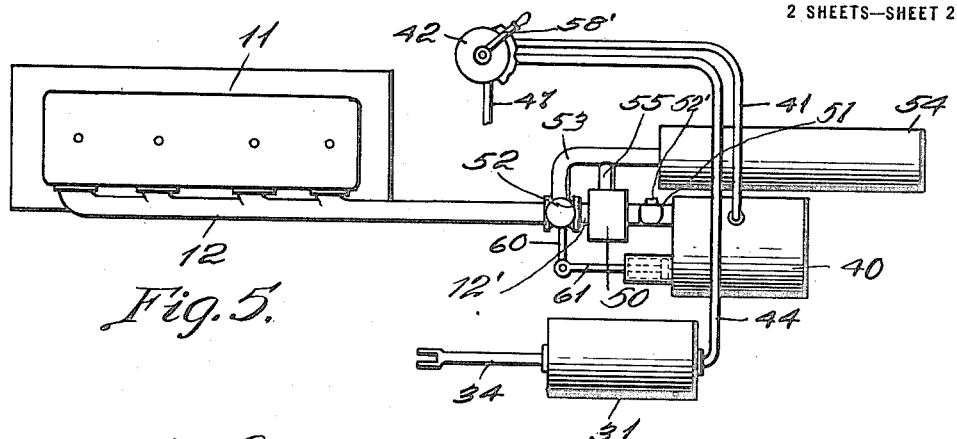
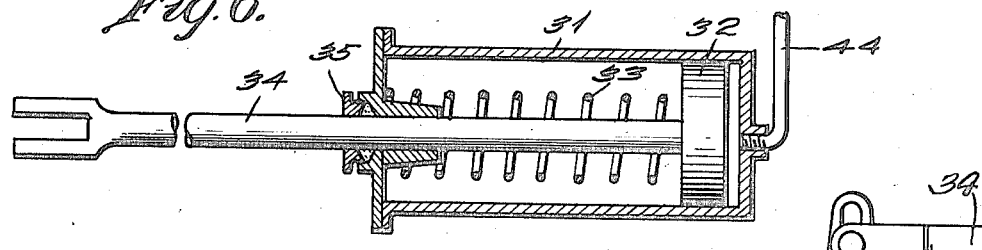
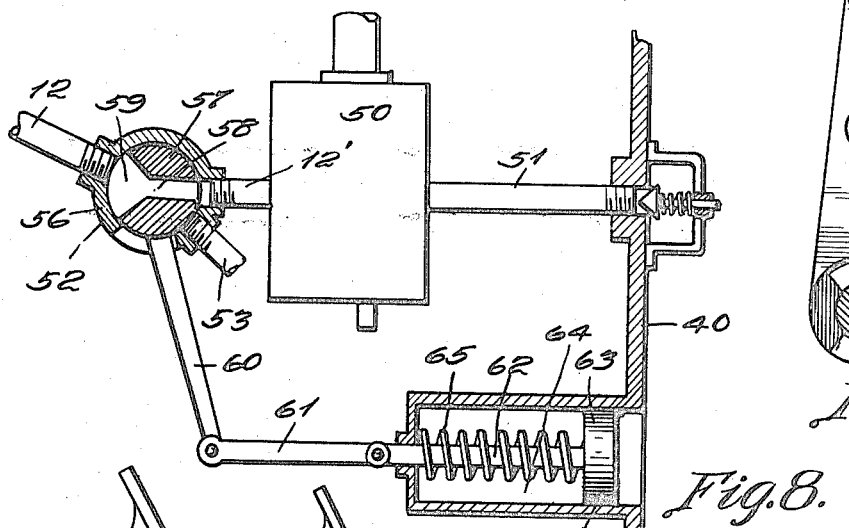
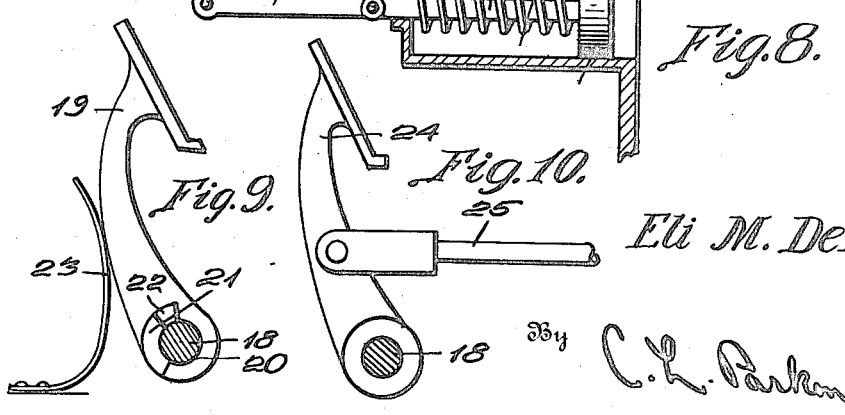

UNITED STATES PATENT OFFICE.

ELI M. DE LAY, OF CHATTANOOGA, TENNESSEE.

FLUID-PRESSURE-OPERATED APPARATUS FOR STOPPING AUTOMOBILES OR THE LIKE.

1,253,357.　　　　　Specification of Letters Patent.　　Patented Jan. 15, 1918.

Application filed January 10, 1917. Serial No. 141,708.

*To all whom it may concern:*

Be it known that I, ELI M. DE LAY, a citizen of the United States, residing at Chattanooga, in the county of Hamilton and State of Tennessee, have invented certain new and useful Improvements in Fluid-Pressure-Operated Apparatus for Stopping Automobiles or the like, of which the following is a specification.

My invention relates to improvements in fluid pressure operated apparatus for stopping an automobile or like vehicle, preferably by rendering the clutch mechanism inactive, and applying the brakes.

An important object of the invention is to provide apparatus of the above mentioned character, which is actuated by means of a manually moved member or lever, preferably arranged in proximity to the steering wheel, such apparatus being convenient in use, and reliable in operation.

A further object of the invention is to provide apparatus of the above mentioned character, having means to utilize the exhaust from the engine, for storing up fluid pressure, together with automatic means for maintaining the stored fluid pressure at a substantially constant degree.

A further object of the invention is to provide apparatus of the above mentioned character, which may be installed upon or used in connection with an ordinary automobile, without materially altering the construction thereof.

A further object of the invention is to provide apparatus of the above mentioned character, which is comparatively simple in construction, strong, and durable.

Other objects and advantages of the invention will be apparent during the course of the following description.

In the accompanying drawings forming a part of this specification and in which like numerals are employed to designate like parts through the same, Figure 1 is a plan view of apparatus embodying my invention, Fig. 2 is a plan view of valve mechanism for controlling the entrance and exhaust of fluid pressure to and from the operating cylinder, Fig. 3 is a similar view with the upper portion of the valve removed, Fig. 4 is a side elevation of the valve mechanism, Fig. 4ª is a detail section taken on line 4ª—4ª of Fig. 1, Fig. 5 is a plan view of the fluid pressure operated apparatus, contained in the invention, removed from the frame of the automobile, Fig. 6 is a central longitudinal sectional view through the operating cylinder, associated elements being shown in elevation, Fig. 7 is a side elevation of a crank, as seen from a section taken on line 7—7 of Fig. 1, Fig. 8 is an enlarged plan view of the fluid pressure operated means, controlling the passage of the exhaust from the engine to the pump or to the atmosphere, parts being shown in section for the purpose of illustration, Fig. 9 is a side elevation of a clutch pedal, as viewed from a section taken on line 9—9 of Fig. 1, and, Fig. 10 is a side elevation of a brake pedal, taken on line 10—10 of Fig. 1.

In the drawings, wherein for the purpose of illustration is shown a preferred embodiment of my invention, the numeral 10 designates the frame or chassis of an automobile, of any well known or preferred construction. Arranged upon the forward portion of the chassis is an internal combustion engine 11, having an exhaust pipe 12 connected therewith. The engine 11 is equipped with the usual clutch mechanism 13 connected with a driving shaft 14, extending rearwardly for connection with a differential gear 15. This differential gear serves to drive the rear wheels 16 of the automobile in the well known manner. The numeral 17 designates brake band mechanisms, which are operated by means including a transverse rock-shaft 18′, as will be hereinafter more fully explained.

The clutch mechanism 13 is controlled or rendered inactive by means of a rock shaft 18. This rock shaft may be manually operated by means of a clutch pedal 19, (see Figs. 1 and 9). The clutch pedal 19 has a one-way or lost motion connection with the rock shaft 18, and is provided with an opening 20 to receive the shaft and an enlarged segmental recess 21 receiving a lug or tooth 22, rigidly secured to the shaft. The clutch pedal is normally retained in an elevated position by means of a spring 23 or the like. It is obvious that when the clutch pedal 19 is forced forwardly, it will turn the shaft 18 forwardly and render the clutch mechanism 13 inactive, but the shaft 18 may be turned forwardly without effecting the turning movement of the clutch pedal.

Pivotally supported upon the rock shaft 18 is a manually operated brake pedal 24, (see Fig. 10) having pivotal connection above its pivot with a reach rod 25, extending rearwardly for pivotal connection with the upper end of an upstanding crank 26, having a lost motion connection with a transverse rock shaft 27, such lost motion connection being identical with that shown and described in connection with the brake pedal 19, in Fig. 9. The rock shaft 27 carries depending cranks 28 rigidly secured thereto, to the lower ends of which are pivotally connected reach rods 29, extending rearwardly for pivotal connection with the ends of cranks 30, which are rigidly secured to the rock shaft 18'. It is thus apparent that by forcing the pedal 24 forwardly the rock shafts 27 and 18' will be turned upon their axes and the brake band mechanisms set, without effecting a turning movement of the shaft 18. The shaft 27 may also be turned forwardly without effecting a turning movement of the crank 26. From the foregoing description it is apparent that separate manually operated means are provided to render the clutch mechanism active and for applying the brake.

Fluid pressure operated means are provided to render the clutch mechanism inactive and for applying the brakes, comprising an operating cylinder 31, suitably attached to the chassis, and reciprocating within this cylinder is a piston 32 (see Fig. 6), which is returned to its normal position by means of a spring 33. The piston 32 has connection with a piston rod 34, operating through a stuffing box 35, and pivotally connected with a crank 37, which is arranged upon the rock shaft 18 and has a lost motion connection therewith identical with the lost motion connection shown in connection with the clutch pedal 19, in Fig. 9.

As more clearly shown in Figs. 1 and 7, a reach rod 38 is pivotally connected to the crank 37 between the shaft 18 and the piston rod 34 and extends rearwardly for pivotal connection with an upstanding crank 39, having a lost motion connection with the rock shaft 27, identical with the lost motion mechanism described in connection with the pedal 19, in Fig. 9.

It might be stated at this point that means are provided for introducing fluid pressure into the cylinder 31 to move the piston 32 for different distances. When the piston 32 is first moved for a short distance, the rock shaft 18 is turned sufficiently to render the clutch mechanism inactive while the rod 38 has not been moved sufficiently for applying the brakes. Further movement of the piston 32 in the forward direction retains the clutch mechanism 13 inactive, while the rod 38 is advanced in its forward movement and turns the shaft 27 sufficiently for applying the brakes.

Means are provided for supplying fluid pressure into the cylinder 31, comprising a storage tank 40, suitably arranged upon the chassis. Connected with the storage tank 40 is an outlet pipe 41, connected with the valve casing 42 of valve mechanism. The pipe 41 leads into a port 43 and a pipe 44 leads into a port 45. The casing 42 is further provided with a port 46 communicating with a pipe 47 discharging to the atmosphere. Disposed upon the valve casing 42 is a pivoted valve 48, provided with a segmental groove 49. The pivoted valve 48 is adapted to assume three positions, to wit, an extreme position to the right, whereby the groove 49 places ports 43 and 45 into communication; a central position, whereby the groove 49 is out of communication with ports 43 and 46 and port 45 is therefore closed; and the extreme position to the left or neutral position whereby port 45 is placed into communication with the exhaust port 46. The pipe 44 leads to the cylinder 31 and discharges into the end thereof, behind the piston 32, as clearly shown in Fig. 6.

The valve 48 is turned by means of a handle 58', carrying latch means 59', to engage in notches 60', in a stationary quadrant, the notches defining the three positions of the lever and valve.

The exhaust pipe 12 from the engine 11 is connected by means of a coupling 12' with an air compressing pump 50 of any well known or preferred construction and this pump is connected with the storage tank 40 through the medium of a pipe 51 to supply compressed air thereto. The pipe 51 has a check valve 52', as shown.

A valve mechanism 52 is connected with the pipe 12 and has connection with a branch pipe 53, which is connected to a muffler 54. The exhaust side of the pump 50 is connected with the pipe 53 through the medium of a pipe 55.

As more clearly shown in Fig. 8, the valve mechanism 52 comprises a casing 56, within which is pivoted a valve 57, provided with a passage 58 extending therethrough from one side to the other, with an enlarged end 59. The enlarged end 59 is in permanent registration with the exhaust pipe 12, and the opposite end is adapted to be alternately moved into registration with pipes 12' and 53.

The valve 57 is automatically turned by a crank 60, pivotally connected with the link 61 which is pivoted to a piston rod 62, connected with a plunger 63. The plunger 63 operates within a cylinder 64, which is connected with the tank 40, and has free communication therewith. A spring 65 tends to move the plunger 63 inwardly. The plunger 63 and associated elements serve to maintain substantially constant the degree of fluid pressure within the tank 40. When the plunger 63 is in the inner position, which occurs when the pressure is low, the valve 57 is shifted so that the exhaust operates the pump 50 for supplying compressed air into the tank 40, and when the pressure rises to the desired point, the plunger 63 is forced outwardly and the exhaust is cut off from the pump and passed through the pump 53 to the muffler 54.

The operation of the apparatus is as follows:

The pedals 19 and 24 may be manually operated, in the well known manner, for rendering the clutch mechanism 13 inactive and applying the brakes.

The lever 58' is normally in the release or exhaust position, and when it is desired to operate the fluid pressure means for stopping the automobile, such lever is swung to the extreme position to the right, as indicated in Fig. 2. Fluid pressure will then pass from the storage tank 40 through pipe 41, port 43, groove 49, port 45, pipe 44 and into the end of the cylinder 31. The piston 32 then moves forwardly, and if it is desired to render the clutch mechanism 13 inactive without applying the brakes, when the piston 32 is moved forwardly sufficiently, the lever 58' is then moved to the central position, so that the groove 49 is out of registration with ports 43 and 46, and covers port 45. The pressure is then held within the cylinder 31 and the piston maintained in the shifted position. For applying the brakes, the lever 58' is again moved to the extreme position to the right, and further fluid pressure is fed into the cylinder 31. The piston 32 moves further to the left, the clutch mechanism 13 remaining inactive, while the crank 37 shifts the rod 38 sufficiently for operating the mechanism which actuates the brakes. To restore the piston 32 to the normal position, the lever 58' is moved to the normal or exhaust position, and pressure will exhaust from the cylinder 32 through pipe 44, port 45, groove 49, port 46, and pipe 47 to the atmosphere.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:—

1. The combination with brake mechanism of an automobile, of a fluid pressure storage tank, a fluid pressure pump connected with the storage tank, a conduit receiving the exhaust from the engine of the automobile and connected with the pump, a valve connected in the conduit for controlling the passage of the exhaust to the pump, fluid pressure operated mechanism connected with the valve to shift it and connected with the storage tank to receive pressure therefrom, and fluid pressure operated mechanism connected with the storage tank and serving to operate the brake mechanism.

2. The combination with brake mechanism of an automobile, of a fluid pressure storage tank, a fluid pressure pump connected with the storage tank, a conduit receiving the exhaust from the engine of the automobile and connected with the pump, a valve connected in the conduit for controlling the passage of the exhaust to the pump and to the atmosphere, fluid pressure operated mechanism connected with the valve to shift it and connected in the storage tank to receive pressure therefrom, a cylinder, a piston reciprocating within the cylinder and connected with the brake mechanism, a conduit serving to connect the storage tank and cylinder, and a manually operated valve connecting the conduit.

3. The combination with brake mechanism of an automobile, of a fluid pressure storage tank, a fluid pressure pump having its feed end connected with the storage tank, a conduit receiving the exhaust from the engine of the automobile and connected with the pump, a muffler, a pipe connecting the conduit and muffler, a conduit connected with the exhaust side of the pump and with the pipe, a valve mechanism connected in the first named conduit for controlling the passage of the exhaust to the pump and muffler, a cylinder connected with the storage tank and having communication therewith, a plunger operating within the cylinder, means connecting the plunger with the valve mechanism, and fluid pressure operated mechanism for operating the brake mechanism and connected with the storage tank.

4. In apparatus of the character described, the combination with clutch mechanism of an automobile engine, of brake mechanism, a rock shaft to actuate the clutch mechanism, a crank having a lost motion connection with the rock shaft, a clutch pedal connected with the rock shaft, a rod connecting the crank with the brake mechanism, a cylinder, a piston mounted to reciprocate within the cylinder, a piston rod connecting the piston and crank, and means to supply fluid pressure into the cylinder.

5. In apparatus of the character described, the combination with clutch mechanism of an automobile engine, of a rock shaft to actuate the clutch mechanism, a crank having a lost motion connection with the rock shaft, a clutch pedal having a lost motion connection with the rock shaft, a cylinder, a piston to reciprocate within the cylinder and connected with the crank, and means to supply fluid pressure into the cylinder.

6. In apparatus of the character described, the combination with clutch mechanism of an automobile engine, of a rock shaft to actuate the clutch mechanism, a crank having a lost motion connection with the rock shaft, a clutch pedal having a lost motion connection with the rock shaft, a brake pedal pivotally connected with the rock shaft, means for actuating the clutch mechanism including a second rock shaft, a crank having a lost motion connection with the second named rock shaft, a rod connecting the last named crank with the crank on the first named rock shaft, a third crank having the lost motion connection with the second named rock shaft, a rod connecting the third named crank and the brake pedal, a cylinder, a piston to reciprocate within the cylinder and connected with the crank of the first named rock shaft, and fluid pressure supply means connected with the cylinder.

In testimony whereof I affix my signature in presence of two witnesses.

ELI M. DE LAY.

Witnesses:
JAMES L. CRAWFORD,
B. P. FISHBURNE.